United States Patent Office 3,418,258
Patented Dec. 24, 1968

3,418,258
PRODUCTION OF HIGHLY ACTIVE METALS
OF THE IRON GROUP
Karl Ackermann, deceased, late of Mannheim, Germany, by Karl Siebert, representative of the heirs, Kuhbach, near Lahr, Germany, assignor to Badische Anilin- & Soda-Fabrik Aktiengesellschaft, Ludwigshafen (Rhine), Germany
No Drawing. Filed Feb. 15, 1965, Ser. No. 453,856
Claims priority, application Germany, Feb. 18, 1964,
B 75,478
8 Claims. (Cl. 252—472)

ABSTRACT OF THE DISCLOSURE

Pyrophoric metals of the iron group obtained by allowing solutions containing a salt of a weakly basic metal whose oxides are irreducible at temperatures lower than 1000° C., such as salts of zinc, chromium, and aluminum, and oxidizing anions such as nitrates, persulfates or chlorates, to act on the iron group metals, and reducing the reaction material thus formed with hydrogen.

The present invention relates to a process for the production of highly active metals of the iron group which are suitable for gas purification and as catalysts.

The present preferred method of preparing finely divided nickel which is suitable as a catalyst for chemical reactions, for example hydrogenations of organic compounds, is a method devised by Raney in which aluminum is leached out from alloys of nickel and aluminum with caustic alkali solutions. The nickel remains behind in extremely fine division and in this form is very reactive. It is pyrophoric, in contrast with other finely divided nickel, for example nickel which has been obtained by reduction of oxidic nickel compounds in the temperature range of the commencement of reduction or higher.

It is also known that iron having catalystic activity can be prepared by melting or sintering its oxides with difficultly reducible oxides, for example aluminum oxide, and reducing the product at elevated temperature by means of hydrogen.

It is further known that pyrophoric cobalt can be prepared by reducing with hydrogen a coprecipitate of 1 mole of cobalt hydroxide and 2 moles of aluminum hydroxide.

These prior art methods for the production of active metals are troublesome to carry out and require a considerable period of time.

The object of the present invention is to convert metals of the iron group, especially nickel, into a highly active form in a simpler way.

This object is achieved according to this invention by allowing an aqueous solution of a salt of a weakly basic metal whose oxides are irreducible with hydrogen at temperatures lower than 1000° C. to act in the presence of anions having oxidizing action, if desired at elevated temperature, on the finely powdered metals or porous sintered or pressed material prepared therefrom, and reducing with hydrogen the reaction material thus formed, preferably after it has been dried, at temperatures of more than 250° C., preferably of from 300° to 600° C.

It is advantageous to react very fine powder, for example powder such as is obtained by thermal decomposition of the corresponding carbonyls and having a particle size of from approximately 2 to 10μ. It is not necessary that this powder be used in the powdered form, but it may be converted by sintering, if desired under superatmospheric pressure, at temperatures of from 500° to 1000° C., for example at 900° C., or by pressing in a conventional way, into a highly porous, mechanically strong material of any desired shape and this material may be subjected to the treatment according to this invention. Depending on the particular purpose for which the active metals are to be used, it is possible to start from more strongly sintered material having smaller pore volume so that after the treatment according to this invention a material is formed which is more resistant mechanically than is the case when starting from a more porous and less strongly sintered material.

Salts of zinc, chromium and aluminum are particularly suitable as salts of weakly basic metals. Nitrates, persulfates or chlorates, for example, may be used as oxidizing anions, and it is particularly advantageous to use a solution of aluminum nitrate as the activating solution. To achieve extensive activation it is advantageous to add to the solutions a weak acid, for example acetic acid. In principle, acids which follow Ostwald's step rule (Ostwald's dilution law, i.e., weak acids which are fully or partly dissociated only at high dilution) are suitable as weak acids. For example a salt solution may be used which contains up to 10% by weight of acetic acid.

By the action of these solutions on the powdered metal, the latter is converted to a greater or lesser degree, depending on the way in which the reaction is carried out, into oxidic compounds from which the active form of the metal forms after reduction. For example when using a solution of aluminum nitrate, there is formed from nickel a nickel hydroxide or basic nickel nitrate which is permeated by oxidic aluminum compounds. The degree of conversion depends on the reaction time, the concentration of the solution and the temperature used. When using an almost concentrated solution of aluminum nitrate, containing for example 2 to 3 parts by weight of crystallized aluminum nitrate $(Al(NO_3)_3 \cdot 9H_2O)$ in 1 part by weight of water, an adequate conversion of the nickel into its oxidic compounds is obtained after a reaction period of two hours at temperatures of 50° to 80° C.; the oxidic compounds are converted into active nickel by subsequent reduction for at least 30 minutes. It is also possible to add a salt of the metal to be treated, preferably a salt having an oxidizing anion, for example a nitrate, to the salt solution. In this case not only is the oxidic nickel compound formed by the action of the solution on the framework, but it is also introduced into the reaction material from outside. The reaction material, which as a rule contains unreacted metal may be molded, if desired after adding suitable additives, for example graphite, prior to reduction. It is also advantageous to dry the material after the reaction.

Untreated powder may also be added to the material. During the subsequent reduction, the moldings are further compacted at sufficiently high reduction temperatures.

When porous material prepared by sintering or pressing is to be treated, it is impregnated with a salt solution which should be as concentrated as possible. The solution is allowed to act on the metallic material for example for two hours, advantageously in an atmosphere saturated with water vapor. Considerably shorter periods, for example 30 minutes, also give an active and pyrophoric metal powder after the reduction with hydrogen. Following the treatment with the salt solution, but advantageously prior to reduction with hydrogen, the material may be brought into the desired shape for example by molding.

It has proven to be advantageous, after the powder or porous material has been treated with the solution of a weakly basic metal, to treat it with an aqueous solution of an alkali metal hydroxide, if desired at elevated temperature.

Active metals prepared in a simple way according to this invention have an extremely high activity. They have to be stored out of contact with oxygen because they are very pyrophoric. Owing to their high activity, they are suitable for gas purification, for example for the removal of small amounts of oxygen or organic sulfur compounds from synthesis gas. They are also eminently suitable as catalysts. Catalysts prepared according to this invention lend themselves for use in hydrogenation and dehydrogenation reactions i.e., reactions for which Raney nickel has mainly been used hitherto. As compared with Raney nickel catalysts they have the advantage that they can be regenerated by treatment with hydrogen at temperatures above 250° C., especially 300° to 600° C. If they are used for gas purification, they may also be regenerated at the said temperatures by reduction with hydrogen.

The invention is illustrated by the following examples.

Example 1

500 g. of a light nickel powder (which has been obtained by thermal decomposition of nickel carbonyl) is well mixed with 1250 ccm. of an aluminum nitrate solution which is practically saturated at room temperature and which contains 10% of acetic acid, and the mixture is kept at a temperature of 50° C. for two hours in a covered vessel. Then 2 liters of a 20% by weight caustic potash solution is added to the reaction mixture. After a reaction period of two hours at 50° to 60° C., the caustic potash solution is decanted and the sediment washed with water a number of times, dried and then reduced with hydrogen at 450° C.

The powder obtained is pyrophoric and has to be stored for example under caustic potash solution, methanol or benzene. It may be used instead of Raney nickel for the hydrogenation of tetrahydrobenzaldehyde to hexahydrobenzaldehyde.

Example 2

A highly porous nickel plate having a thickness of about 5 to 7 mm. and a pore volume of 80 to 84%, which has been prepared by sintering carbonyl nickel powder, is dipped into a solution of aluminum nitrate which has been prepared by dissolving 2.5 parts by weight of crystallized aluminum nitrate $(Al(NO_3)_3 \cdot 9H_2O)$ in 1 part by weight of water. The sintered plate, whose pores are thus filled with the solution, is then placed on a grate in a covered vessel having some water at the bottom. The whole is slowly heated to 80° C. and left for two hours at that temperature. The plate is then placed in 20% caustic potash solution at 50° C. for about an hour, and then rinsed and dried. The framework of sintered nickel which has been partly converted into oxidic nickel compounds is then broken into pieces having edges 6 to 12 mm. in length and these are reduced in a current of hydrogen at a temperature of 400° to 500° C. until steam is no longer detectable in the off-gas.

I claim:

1. A process for the production of highly active and pyrophoric metals of the iron group wherein an aqueous solution of at least one salt of a weakly basic metal, said metal being a member selected from the group consisting of zinc, chromium and aluminum, is allowed to act for at least thirty minutes in the presence of a weak acid following Ostwald's dilution law and at least one oxidizing anion, said anion being a member selected from the group consisting of nitrate, persulfate and chlorate, on a metal of the iron group, and the reaction product obtained is reduced with hydrogen at temperatures from 300° C. to 600° C.

2. A process as claimed in claim 1 wherein the salt solution is allowed to act at a temperature of from 50° C. to 80° C.

3. A process as claimed in claim 1 wherein a salt of the metal to be activated is added to the salt solution.

4. A process as claimed in claim 1 wherein the nitrate of the metal to be activated is added to the salt solution.

5. A process as claimed in claim 1 wherein, following the action of the salt solution, the reaction material is treated with an aqueous solution of a hydroxide of an alkali metal and the reaction material is then washed with water.

6. A process as claimed in claim 1 wherein said metal of the iron group is finely powdered.

7. A process as claimed in claim 1 wherein said metal of the iron group is in the form of a porous article.

8. A process as claimed in claim 1, wherein said weak acid is acetic acid.

References Cited

UNITED STATES PATENTS

| | | | |
|---|---|---|---|
| 1,271,013 | 7/1918 | Bosch et al. | 252—472 |
| 3,114,719 | 12/1963 | Aries | 252—472 |

FOREIGN PATENTS 19,494   4/1929   Australia.

DANIEL E. WYMAN, *Primary Examiner.*

P. E. KONOPKA, *Assistant Examiner.*

U.S. Cl. X.R.

252—470, 473, 466, 477; 23—2; 260—598